US010305359B2

(12) United States Patent
Song et al.

(10) Patent No.: US 10,305,359 B2
(45) Date of Patent: May 28, 2019

(54) ANTI-TILT ELECTROMAGNETIC MOTOR

(71) Applicant: TDK TAIWAN CORP., Yangmei Taoyuan (TW)

(72) Inventors: Bing Ru Song, Yangmei Taoyuan (TW); Cheng Kai Yu, Yangmei Taoyuan (TW); Chao Chang Hu, Yangmei Taoyuan (TW)

(73) Assignee: TDK TAIWAN CORP., Yangmei, Taoyuan (TW)

( * ) Notice: Subject to any disclaimer, the term of this patent is extended or adjusted under 35 U.S.C. 154(b) by 154 days.

(21) Appl. No.: 15/419,298

(22) Filed: Jan. 30, 2017

(65) Prior Publication Data

US 2017/0141669 A1    May 18, 2017

Related U.S. Application Data

(63) Continuation of application No. 14/706,608, filed on May 7, 2015, now Pat. No. 9,601,968.

(30) Foreign Application Priority Data

Jun. 23, 2014    (TW) .............................. 103121503 A

(51) Int. Cl.
| | |
|---|---|
| *H02K 41/02* | (2006.01) |
| *G02B 7/02* | (2006.01) |
| *H02K 7/08* | (2006.01) |
| *H02K 7/00* | (2006.01) |
| *G02B 7/08* | (2006.01) |

(Continued)

(52) U.S. Cl.
CPC ............... *H02K 41/02* (2013.01); *G02B 7/02* (2013.01); *G02B 7/08* (2013.01); *G02B 7/09* (2013.01); *G02B 7/10* (2013.01); *G02B 7/102* (2013.01); *H02K 7/00* (2013.01); *H02K 7/08* (2013.01); *H02K 11/215* (2016.01); *H02K 41/0356* (2013.01); *G02B 7/1828* (2013.01)

(58) Field of Classification Search
CPC ............... H02K 41/02; H02K 41/0356; G02B 7/003–005; G02B 7/023; G02B 7/04–105; G02B 7/14–16
USPC ................ 359/694–706, 813–814, 822–826; 396/52–55, 132, 342–343, 508; 348/335
See application file for complete search history.

(56) References Cited

U.S. PATENT DOCUMENTS 7,869,150 B2    1/2011    Yoon et al.
2009/0268319 A1    10/2009    Woo et al.
(Continued)

FOREIGN PATENT DOCUMENTS

JP    2009145771 A  *  7/2009

OTHER PUBLICATIONS

JP2009-145771 translation obtained Aug. 28, 2018.*

*Primary Examiner* — Kristina M Deherrera
(74) *Attorney, Agent, or Firm* — Muncy, Geissler, Olds & Lowe, P.C.

(57) ABSTRACT

An anti-tilt electromagnetic motor is provided, including a frame, a support base, a contact assembly, a drive assembly, and an elastic assembly. The support base is arranged movably relative to the frame along an axis. The contact assembly is disposed between the frame and the support base and directly contacts the frame and the support base. The drive assembly is configured to drive the support base to move. The elastic assembly is configured to provide a pre-loading force so as to enable the contact assembly to be compressed by the frame and the support base.

18 Claims, 6 Drawing Sheets

(51) Int. Cl.
  *G02B 7/10* (2006.01)
  *H02K 11/215* (2016.01)
  *H02K 41/035* (2006.01)
  *G02B 7/09* (2006.01)
  *G02B 7/182* (2006.01)

(56) References Cited

U.S. PATENT DOCUMENTS

| | | |
|---|---|---|
| 2010/0232161 A1 | 9/2010 | Aschwanden et al. |
| 2012/0320467 A1 | 12/2012 | Baik et al. |
| 2013/0027790 A1 | 1/2013 | Park et al. |
| 2014/0104710 A1 | 4/2014 | Heo et al. |
| 2014/0118854 A1 | 5/2014 | Kirii |

\* cited by examiner

ANTI-TILT ELECTROMAGNETIC MOTOR

CROSS REFERENCE TO RELATED APPLICATIONS

The present application is a continuation application of the U.S. application Ser. No. 14/706,608 filed on May 7, 2015 which claims priority of Taiwan Patent Application No. 103121503, filed on Jun. 23, 2014, the entirety of which is incorporated by reference herein.

BACKGROUND OF THE DISCLOSURE

Field of the Invention

The present invention relates to a driving module and a lens device using the same, and more particularly to an anti-tilt electromagnetic motor which is able to prevent the tilting of an element supported thereby and a lens device using the same.

Description of the Related Art

Generally, an electronic device includes a driving module to drive an element to move a predetermined distance. For example, an electronic device having an image-capture function usually includes a driving module to generate driving power. One or more optical lens units of the electronic device are driven by the driving power to move along an optical axis, so as to facilitate auto-focus and auto-zoom controls.

However, since the driving module includes a complex driving member, such as stepper motor, ultrasonic motor, or piezoelectric actuators, etc. to generate the driving power, and the driving power has to be transmitted by a number of transmission elements, it is not easy to assemble and the manufacturing cost is high. In addition, the conventional driving module is also large in size and has a high power consumption due to its complex construction.

U.S. Pat. No. 7,869,150 discloses a camera module including a lens assembly and a driving element. The lens assembly is slidably connected to a shaft. The driving element includes a yoke, a coil, and a magnet. The magnet is disposed on one side of the lens assembly. When an electronic current passes through the coil, the lens module is controlled to move up and down by the magnetic force generated by the coil. In addition, a friction force system is established between the lens assembly and the shaft via the magnetic force generated between the yoke and the magnet. Therefore, the lens assembly is positioned via the friction force system. However, if an outer force (due to collision or swinging) is applied to the camera module, the lens assembly may move away from the magnet, and the magnetic force is gradually decreased as the distance increases. As a result, the reliability of the camera module is degraded.

US patent application 2012/0320467 discloses an image capturing device including a lens barrel and a housing. The lens barrel is disposed on the housing via an elastic member, and thus the tilting due to collision of the lens barrel with the other elements during operation is prevented. However, the lens barrel may swing in the housing as an outer force is applied to the device. Thus, the image quality of the image capturing device is not ensured.

Therefore, a driving module having the advantages of high reliability is desired by the manufactures.

SUMMARY

Accordingly, one objective of the present invention is to provide a driving module, which has the advantage of high reliability and low power consumption.

According to some embodiments of the disclosure, the anti-tilt electromagnetic motor includes a frame, a support base, a contact assembly, a drive assembly, and an elastic assembly. The frame includes a first lateral sub-frame, a second lateral sub-frame, and a front sub-frame positioned between the first lateral sub-frame and the second lateral sub-frame. The support base is arranged movably relative to the frame along a main axis. A portion of the contact assembly is disposed between the support base and a portion of the first lateral sub-frame that is adjacent to the front sub-frame. Another portion of the contact assembly is disposed between the support base and a portion of the second lateral sub-frame that is adjacent to the front sub-frame. The drive assembly is configured to actuate a movement of the support base. The elastic assembly connects the support base to the front lateral sub-frame and is configured to provide a pre-loading force so as to enable the contact assembly to be compressed by the frame and the support base.

In some embodiments, the contact assembly includes a plurality of ball bearings or a plurality of bearings. The frame further includes two first guide portions facing each other. The support base includes two second guide portions respectively facing the two first guide portions. The ball bearings or the bearings are disposed between one of the first guide portions and the corresponding second guide portion.

In some embodiments, the support base and the drive assembly are arranged along a first axis, and the two first guide portions and the two second guide portions are arranged along a second axis perpendicular to the first axis.

In some embodiments, the elastic assembly is connected to the front sub-frame via two first fixing portions. The two fixing portions are symmetrical about the first axis. In addition, the two first guide portions are symmetrical about the first axis, and the two second guide portions are symmetrical about the first axis. In some embodiments, the two first fixing portions, the two first guide portions, and the two second guide portions are arranged along the second axis.

In some embodiments, the driving assembly includes a coil and a magnetic element, wherein one of the coil and the magnetic element is disposed on the support base, and the other one of the coil and the magnetic element is disposed corresponding to the one of the coil and the magnetic element disposed on the support base and separated from that by a distance. A magnetic force generated by the coil relative to the magnetic element is greater than the weight of the support base.

In some embodiments, each of the two first guide portions includes a groove, and each of the two second guide portions includes a groove.

In some embodiments, the elastic assembly includes at least one sheet-shaped spring, arranged on a plane perpendicular to the main axis. When the support base is moved along the main axis, the elastic assembly is stretched along the main axis to provide the pre-loading force.

Another objective of the disclosure is to provide a lens device using the anti-tilt electromagnetic motor. According to some embodiments of the disclosure, the lens device includes an anti-tilt electromagnetic motor mentioned in any of the above embodiments and a lens assembly. The support base is configured to support the lens assembly and actuate a movement of the lens assembly along the optical axis thereof. Because the lens assembly is stably positioned by the anti-tilt electromagnetic motor, the image quality of the lens device is improved.

BRIEF DESCRIPTION OF THE DRAWINGS

For a more complete understanding of the embodiments, and the advantages thereof, reference is now made to the following descriptions taken in conjunction with the accompanying drawings.

DESCRIPTION OF THE ILLUSTRATIVE EMBODIMENTS

The following description is of the best-contemplated mode of carrying out the invention. This description is made for the purpose of illustrating the general principles of the invention and should not be taken in a limiting sense. The scope of the invention is best determined by reference to the appended claims. For convenience of explanation and accurate definition in the appended claims, the terms "upper", "lower", "left", "right", "front", and "rear" are used to describe features of the exemplary embodiments with reference to the positions of such features as displayed in the figure and do not limit the invention to any particular orientation of a ratchet wrench embodying the disclosure.

Figure 1:
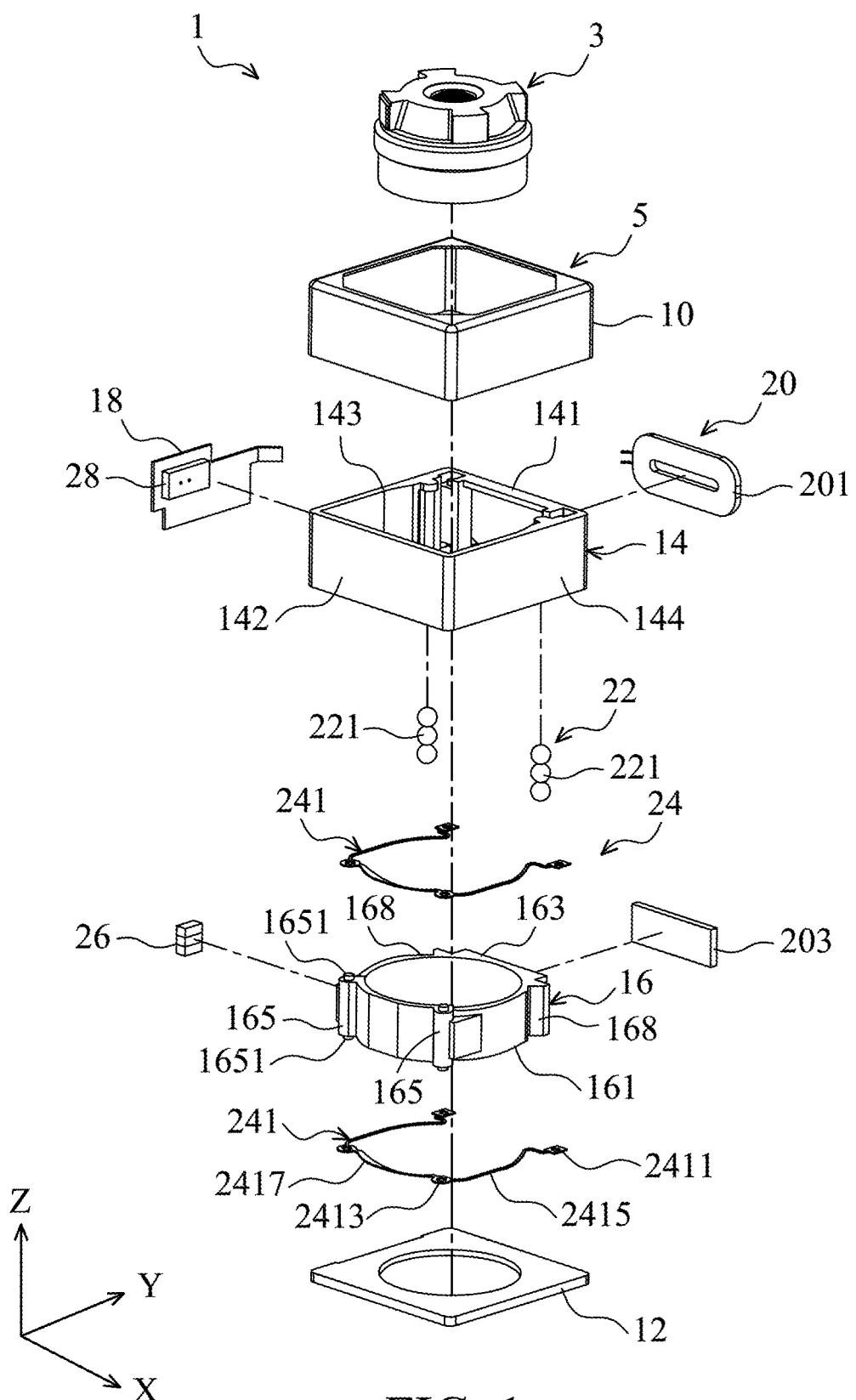
FIG. 1 shows an exploded view of a lens device, in accordance with some embodiments.

FIG. 1 shows an exploded view of a lens device 1, in accordance with some embodiments. In some embodiments, the lens device 1 includes a lens assembly 3 and an anti-tilt electromagnetic motor 5. The anti-tilt electromagnetic motor 5 is configured to support the lens assembly 3 and actuate a movement of the lens assembly 3 back and forth along an optical axis (Z-axis) of the lens assembly 3 to capture an image from the outside of the lens device 1.

In some embodiments, the anti-tilt electromagnetic motor 5 includes an upper housing 10, a lower housing 12, a frame 14, a support base 16, a flexible circuit board 18, a drive assembly 20, a contacting assembly 22, an elastic assembly 24, a reference member 26, and a sensor element 28. The element of the anti-tilt electromagnetic motor 5 can be added or omitted, and the invention should not be limited by the embodiment.

An accommodation space (not indicated) is defined by the upper housing 10 and the lower housing 12. The frame 14, the support base 16, the flexible circuit board 18, the drive assembly 20, the contacting assembly 22, the elastic assembly 24, the reference member 26, and the sensor element 28 are disposed in the accommodation space.

Figure 2:
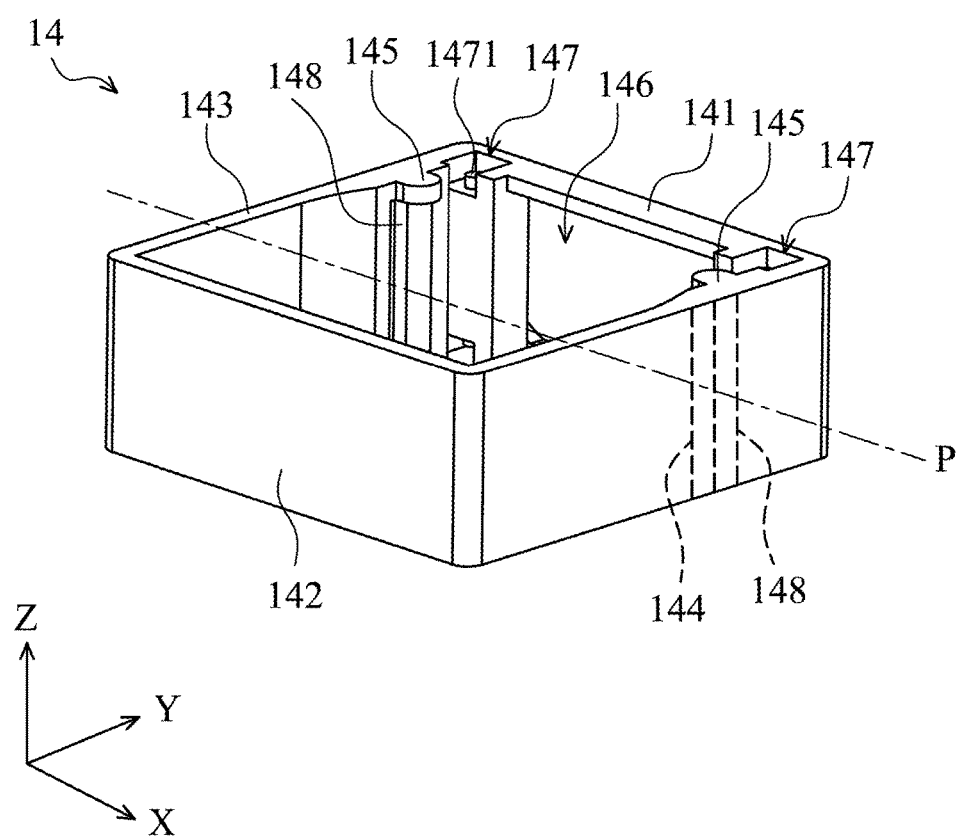
FIG. 2 shows a schematic view of a frame of an anti-tilt electromagnetic motor, in accordance with some embodiments.

FIG. 2 shows a schematic view of the frame 14, in accordance with some embodiments. In some embodiments, the frame 14 includes a number of sub-frames, such as a front sub-frame 141, a rear sub-frame 142, a first lateral sub-frame 143, and a second lateral sub-frame 144. The front sub-frame 141 and the rear sub-frame 142 respectively connect the first lateral sub-frame 143 to the second lateral sub-frame 144. In some embodiments, the front sub-frame 141 is opposite to the rear sub-frame 142, and the first lateral sub-frame 143 is opposite to the second lateral sub-frame 144. In some embodiments, the front sub-frame 141 is perpendicular to the first lateral sub-frame 143 and the second lateral sub-frame 144. In some embodiments, the inner walls of each of the front sub-frame 141, the first lateral sub-frame 143, and the second lateral sub-frame 144 collectively form a curved surface. In some embodiments, the front sub-frame 141, the first lateral sub-frame 143, and the second lateral sub-frame 144 are formed integrally. The frame 14 may be made of plastic material.

In some embodiments, a passage 146 penetrates a substantial center of the front sub-frame 141. In addition, at two sides of the passage 146, two recesses 147 are formed on each of the upper edge and the lower edge of the front sub-frame 141 (the recesses formed on the lower edge are not shown in FIG. 2). A positioning member 1471 is protruded from the bottom of each recess 147. The positioning members 1471 are used to fix the elastic assembly 24.

Figure 3:
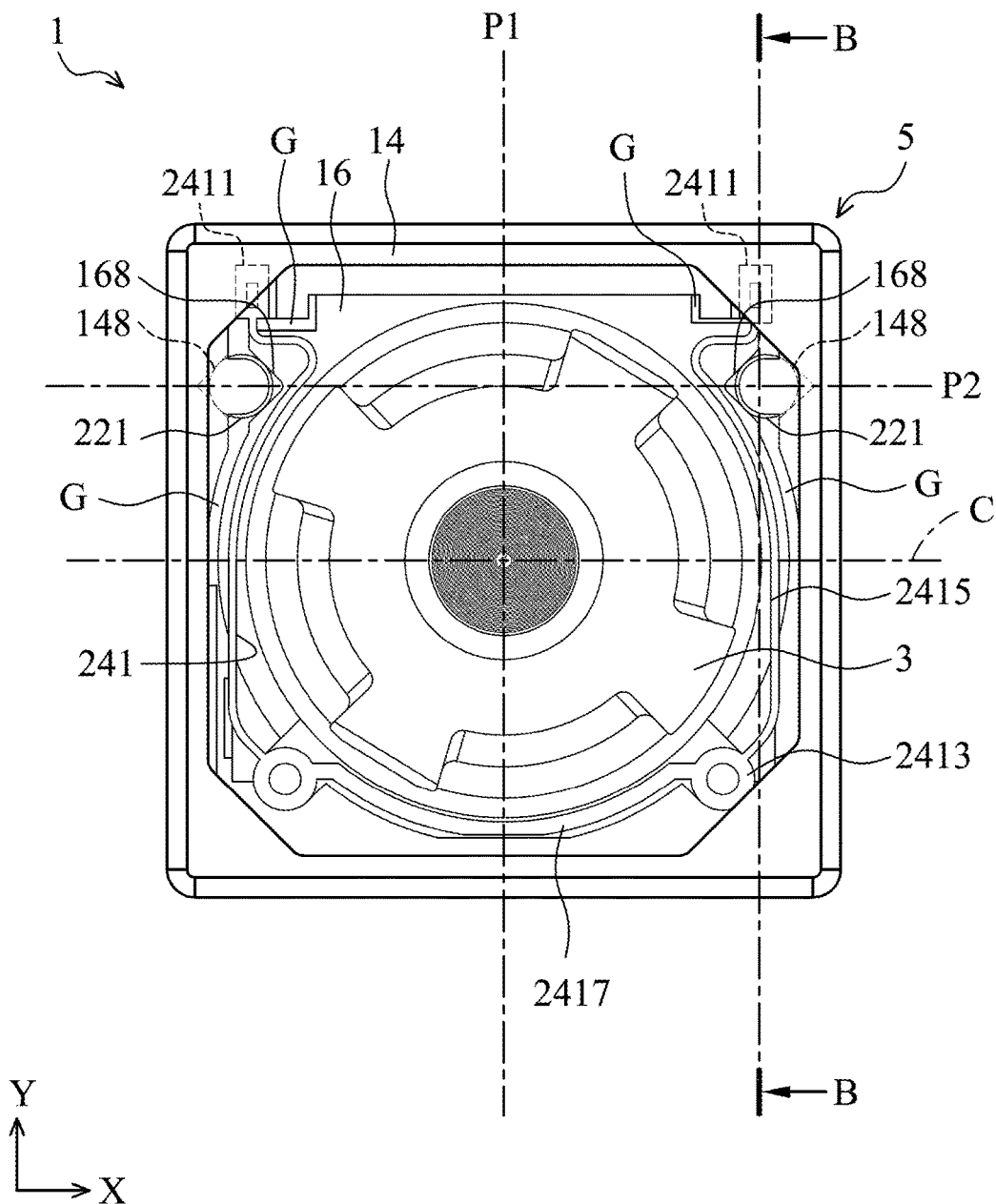
FIG. 3 shows a top view of a lens device, in accordance with some embodiments.

In some embodiments, the frame 14 further includes one or more stop members 145 and one or more first guide portions 148. In some embodiments, the frame 14 includes two stop members 145 and two first guide portions 148. The two stop members 145 and the two first guide portions 148 are disposed on the first lateral sub-frame 143 and the second lateral sub-frame 144 to limit the position of the contacting assembly 22. Specifically, the upper surface of one of the two stop members 145 is aligned with the upper surface of the first lateral sub-frame 143 and located adjacent to the front sub-frame 141. In addition, the upper surface of the other stop member 145 is aligned with the upper surface of the second lateral sub-frame 144 and located adjacent to the front sub-frame 141. The two first guide portions 148 respectively correspond to the two stop members 145 and are formed on the first lateral sub-frame 143 and the second lateral sub-frame 144. In some embodiments, each of the first guide portions 148 includes a groove extending along a direction parallel to a main axis (Z-axis) of the anti-tilt electromagnetic motor 5. In some embodiments, as shown in FIG. 3, the two first guide portions 148 are symmetrical with one another about a first axis P1 and directly face one another along a second axis P2.

Referring to FIG. 1 again, the support base 16 is movably relative to the frame 14 along a direction parallel to the main axis (Z-axis) of the anti-tilt electromagnetic motor 5 and configured to support an element, such as the lens assembly 3. In some embodiments, the support base 16 is surrounded by the frame 14. The support base 16 includes a main body 161, a connecting member 163, two fixing members 165, and two second guide portions 168. The main body 161 is a hollow cylindrical structure, and the lens assembly 3 is disposed in the main body 161. The connecting member 163 connects to the main body 161 and is adjacent to the passage 146 of the front sub-frame 141. In some embodiments, the connecting member 163 includes a recess, and some elements of the drive assembly 20 are disposed in the recess. Each of the two fixing members 165 has a cylindrical structure. The two fixing members 165 are disposed on a side of the main body 161 away from the front sub-frame 141. The two fixing members 165 are spaced from each other by a distance in a circumferential direction of the main body 161. Each of the two fixing members 165 has two positioning members 1651 respectively formed on its upper and lower ends for fixing the elastic assembly 24. The two second guide portions 168 are formed on two side of the main body 161 and respectively face one of the two first guide portions 148. As a result, the two second guide portions 168 are symmetrical with one another about to the first axis P1 and are arranged along the second axis P2 (FIG. 3). In some embodiments, each second guide portion 168 includes a groove extending along a direction parallel to the main axis (Z-axis) of the anti-tilt electromagnetic motor 5.

The flexible circuit board 18 is configured to receive the electric signals and/or power from an outside circuit. In some embodiments, the flexible circuit board 18 is adjacent to the outer side of the second lateral sub-frame 144. The electric signals or power from the outside circuit are transmitted to the other elements of the anti-tilt electromagnetic motor 5.

The drive assembly 20 is electrically connected to the flexible circuit board 18 and configured to actuate a movement of the support base 16. In some embodiments, the drive assembly 20 includes a coil 201 and a magnetic element 203. The magnetic element 203 is disposed on the connecting member 163 of the support base 16 and positioned in the passage 146 of the frame 14. The coil 201 is disposed on the frame 14. The coil 201 faces the magnetic element 203 and is separated from the magnetic element 203 by a distance. The coil 201 is not connected to the magnetic element 203. As a whole, the support base 16 and the drive assembly 20 are arrange along the first axis P1 (FIG. 3) perpendicular to the second axis P2. Electrical current from an outside circuit is transmitted to the coil 201 via the flexible circuit board 18. A magnetic field is produced by the coil 201 after the coil 201 receives electrical current. The magnetic element 203 drives the support base 16 to move along the main axis (Z-axis) of the anti-tilt electromagnetic motor 5 by the magnetic field.

Figure 6:
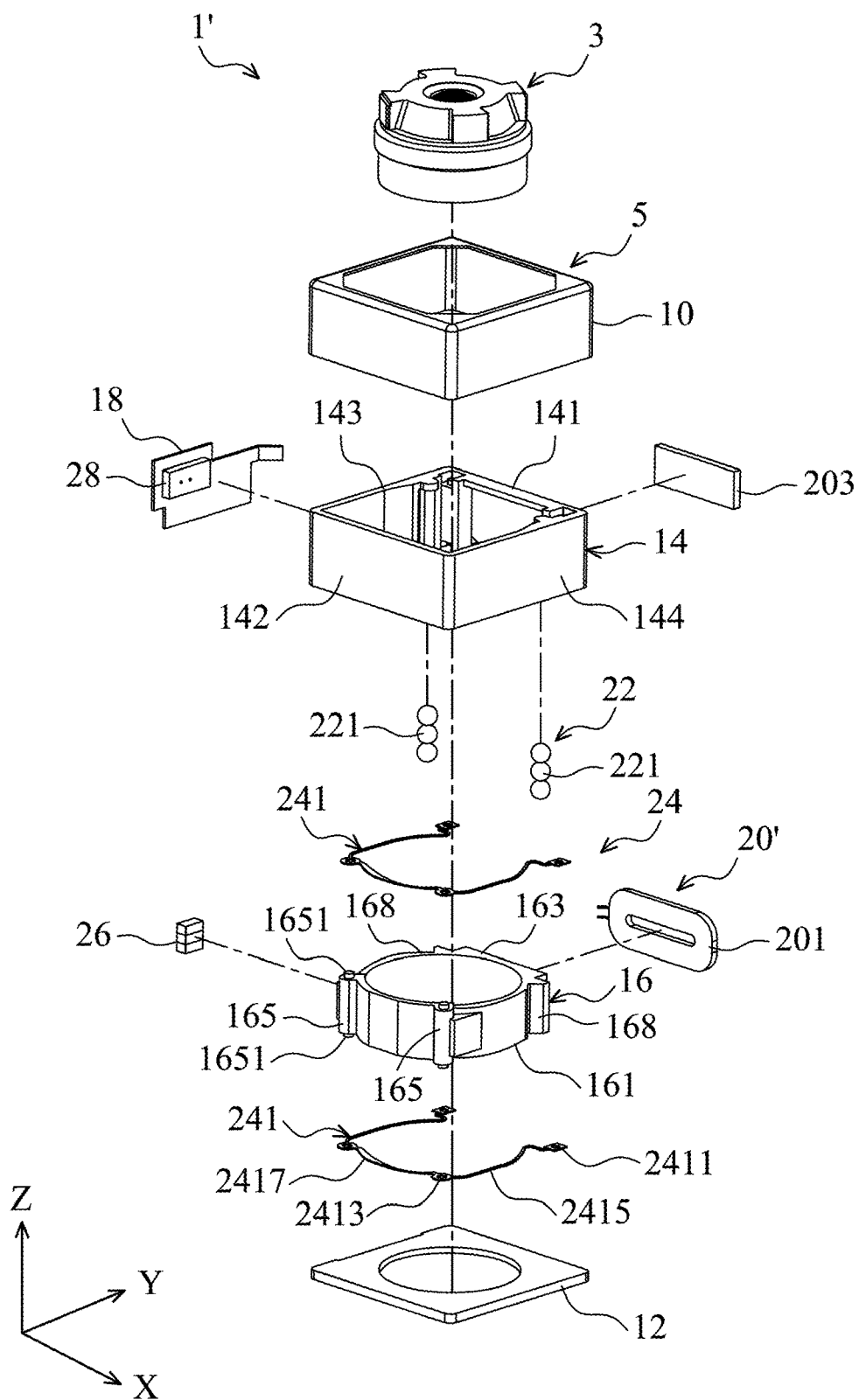
FIG. 6 shows an exploded view of a lens device, in accordance with some embodiments.

It is appreciated that the arrangement of the coil 201 and the magnetic element 203 should not be limited to the above-mentioned embodiments. For example, as shown in FIG. 6, a coil 201 of a drive assembly 20' of a lens device 1' is disposed on the connecting member 163 of the support base 16 and located in the passage 146 of the frame 14. The magnetic element 203 is disposed on the frame 14. Electrical current from the outside circuit is transmitted to the coil 201 via the flexible circuit board 18.

Referring to FIG. 1 again, the contact assembly 22 is disposed between the support base 16 and the frame 14 and configured to enable the movement of the support base 16 relative to the frame 14. In some embodiments, the contact assembly 22 includes a number of ball bearings 221. The ball bearings 221 are disposed between each first guide portion 148 and the corresponding second guide portion 168 and directly contact the first guide portion 148 and the second guide portion 168. In some embodiments, the contact assembly 22 includes a number of bearings. The bearings are disposed between each first guide portion 148 and the corresponding second guide portion 168 and directly contact the first guide portion 148 and the second guide portion 168.

FIG. 3 shows the top view of a lens device 1, in accordance with some embodiments. The elastic assembly 24 connects the support base 16 to the frame 14 and is configured to provide a pre-loading force to the support base 16 along a direction parallel to the first axis P1, so as to enable the contact assembly 22 to be compressed by the first guide portions 148 and the second guide portions 168 simultaneously. In some embodiments, the elastic assembly 24 includes two elastic elements 241. The two elastic elements 241 are respectively arranged on planes that are perpendicular to the main axis (Z-axis) of the anti-tilt electromagnetic motor 5. Specifically, the two elastic elements 241 are connected to two opposite sides of the support base 16 along a direction parallel to the main axis. Namely, one of the two elastic elements 241 is disposed on the upper side of the support base 16, and another elastic element 241 is disposed on the lower side of the support base 16. The two elastic elements 241 connect the support base 16 to the frame 14. It is appreciated that the number and the connection relationship of the elastic elements 241 should not be limited to the above-mentioned embodiments. In some non-illustrated embodiments, the elastic assembly 24 includes one elastic element 241. The elastic element 241 surrounds the outer surface of the main body 161 of the support base 16 and connects the support base 16 to the frame 14.

As depicted in FIG. 3, the ball bearings 221 are movably disposed in a gap G between the frame 14 and the support base 16. In this embodiment, the ball bearings 221 are situated on opposite sides of the first axis P1 and in contact with the frame 14 and the support base 16. As the elastic element 241 extends across the gap G and directly connects the support base 16 with the frame 14, the ball bearings 221 can be pressed between the frame 14 and the support base 16 by the spring force of the elastic element 241.

Referring to FIG. 1 again, in some embodiments, each of the elastic elements 241 has a U-shaped configuration and includes two first fixing portions 2411, two second fixing portions 2413, two extension portions 2415, and a connecting portion 2417. Each of the two first fixing portions 2411 and each of the two second fixing portions 2413 respectively have a through hole. Each extension portion 2415 connects one of the two first fixing portions 2411 to one of the two second fixing portions 2413. The connecting portion 2417 connects the two second fixing portions 2413. The two first fixing portions 2411 are respectively disposed at both ends of the elastic elements 241 and fixed on the positioning members 1471 of the frame 14 via suitable means (such as engagement, welding, or gluing). The two second fixing portions 2413 are fixed on the positioning members 1651 of the support base 16 via suitable means (such as engagement, welding, or gluing). It should be noted that a portion of each extension portion 2415 that corresponds to the stop member 145 has a curved structure, such that no interference occurs between the extension portion 2415 and the stop member 145 of the frame 14. In some embodiments, the two first fixing portions 2411, the two first guide portions 148, and the two second guide portions 168 are disposed on the same reference plane to improve the reliability of the support base 16 during movement. For example, the two first fixing portions 2411, the two first guide portions 148, and the two second guide portions 168 are arranged along a reference plane parallel to the second axis P2 (FIG. 3).

In this embodiment, the first and second fixing portions 2411 and 2413 are situated on opposite sides of a central axis C (FIG. 3) of the frame 14, wherein the central axis C is parallel to the X-axis and perpendicular to the first axis P1 and the main axis (Z-axis). Moreover, the first fixing portions 2411 are symmetrical with respect to the first axis P1, and the second fixing portions 2413 are also symmetrical with respect to the first axis P1. It should be noted that the support base 16 and the drive assembly 20 are arranged along the first axis P1, and the first fixing portions 2411 and the drive assembly 20 are situated on the same side of a central axis C of the frame 14 which is perpendicular to the first axis P1 and the main axis (Z-axis).

As shown in FIGS. 1 and 3, the frame 14 has a rectangular structure, and the ball bearings 221 are disposed near the corners of the rectangular structure. Specifically, the ball bearings 221 are disposed along the second axis P2 of the frame 14, wherein the second axis P2 is perpendicular to the first axis P1 and extends through the lens assembly 3 (FIG. 3). Moreover, the ball bearings 221 are situated between the first and second fixing portions 2411 and 2413 along a direction parallel to the first axis P1.

In some embodiments, each of the elastic elements 241 is a sheet-shaped spring which has different spring constants in different directions. For example, the spring constant of each elastic element 241 along a horizontal direction parallel to the X-axis is different from that along a vertical direction parallel to the Y-axis.

The reference element 26 and the sensor element 28 are configured to detect the movement and position of the support base 16 and produce a feedback signal for positioning the support base 16. In some embodiments, the sensor element 28 is disposed on the flexible circuit board 18, and the reference element 26 is disposed on the support base 16. In some embodiments, the reference element 26 is a permanent magnet, and the sensor element 28 is a Hall effect sensor. By detecting the permanent magnet of the reference element 26, the sensor element 28 produces an electrical signal based on the position of the reference element 26, so that the position of the support base 16 is measured.

In another embodiment, the reference element 26 includes an optical emitter, and the sensor element 28 includes a position signal receiver. By receiving the signal from the reference element 26, the sensor element 28 produces an electrical signal based on the position of the reference element 20, so that the position of the support base 16 is measured. The electrical signal produced by the sensor element 28 is transmitted to a control system (not shown in figures) via the flexible circuit board 18 as well. Afterwards, the control system adjusts the electrical current supplied for the drive assembly 20 according to the electrical signal produced by the sensor element 28. As a result, the position of the support base 16 is calibrated.

In some embodiments, the contacting assembly 22 is disposed on the corresponding first and second guide portions 148 and 168, the two elastic elements 241 provide the support base 16 a pre-loading force to move toward the front sub-frame 141 of the frame 14. As a result, the ball bearings 221 of the contacting assembly 22 are compressed by the corresponding first and second guide portions 148 and 168 simultaneously. It should be noted that the pre-loading force is applied along a direction that is parallel to the direction along which the support base 16 and the drive assembly 20 are arranged. In addition, there is no contact between the support base 16 and the front sub-frame 141 of the frame 14.

The anti-tilt electromagnetic motor 5 of the disclosure provides a number of advantages.

Figure 4:
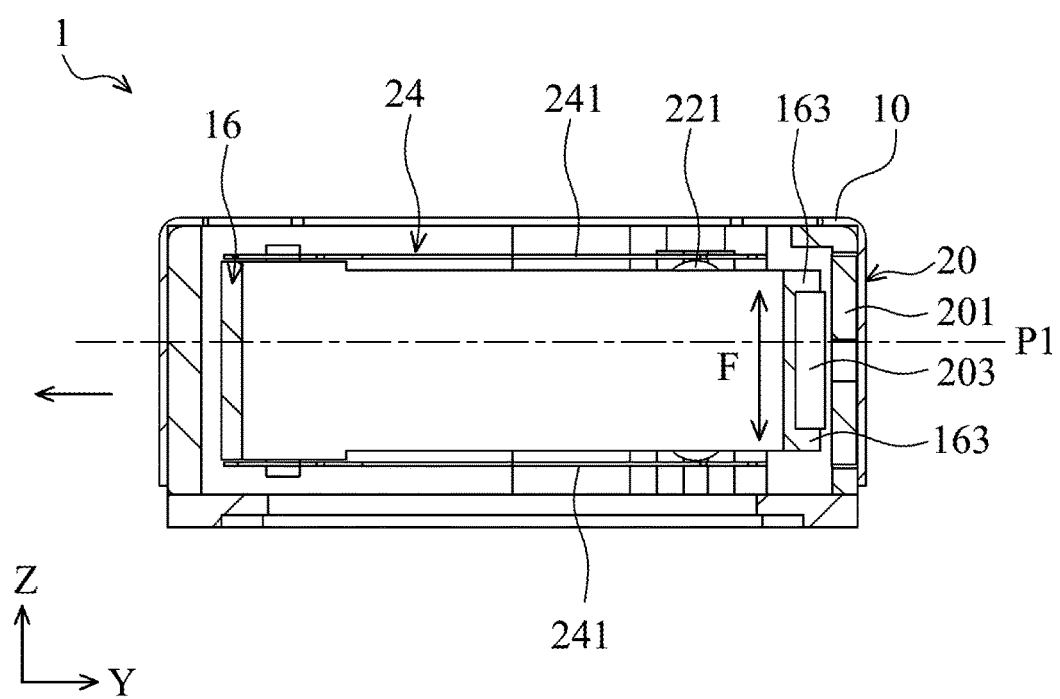
FIG. 4 shows a cross-sectional view taken along a first axis P1 in FIG. 3.
Figure 5:
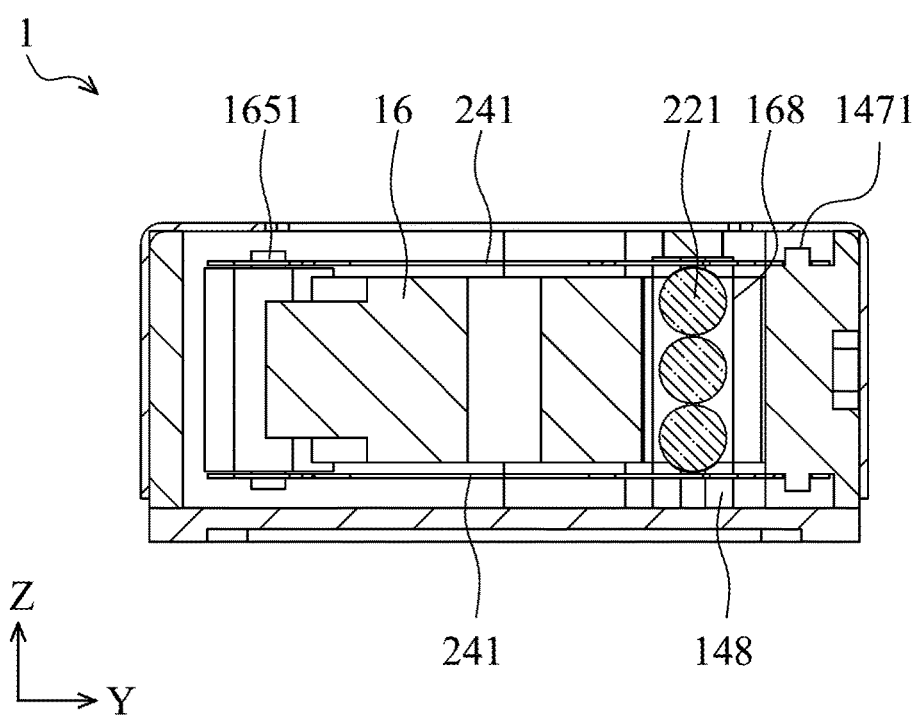
FIG. 5 shows a cross-sectional view taken along line B-B in FIG. 3.

For example, referring to FIGS. 3, 4, and 5, FIG. 4 shows a cross-sectional view taken along a first axis P1 in FIG. 3, and FIG. 5 shows a cross-sectional view taken along line B-B in FIG. 3. As shown in FIG. 4, in some embodiments, in the operation of the lens device 1, a magnetic force F is produced by the drive assembly 20 on a single lateral side of the support base 16, and the support base 16 and/or the lens assembly 3 are moved along the main axis (Z-axis) of the anti-tilt electromagnetic motor 5. In some embodiments, since the magnetic force F is applied to the single lateral side of the support base 16, the support base 16 is tilted during its movement. However, as shown in FIG. 5, when the support base 16 is moved along the main axis (Z-axis), the elastic assembly 24 is deformed in a direction parallel to the main axis (Z-axis). Therefore, a preloading force is provided by the elastic assembly 24, and the support base 16 is able to stably move along the main axis (Z-axis) of the anti-tilt electromagnetic motor 5 via the contacting assembly 22. As a result, the tilting of the support base 16 and/or the lens assembly 3 due to single lateral magnetic force F applied on the support base 16 is prevented. On the other hand, when support base 16 is moved away from the front sub-frame 141 along the direction indicated by the arrow shown at the left side of FIG. 4, the pre-loading force generated by the elastic assembly 24 is proportionally increased. Therefore, the stability of the support base 16 is maintained despite the transverse movement of the support base 16. It should be noted that the above-mentioned effect is boosted if the torsion force generated by the drive assembly 20 and the elastic assembly 24 is much lower.

Additionally, when the lens assembly is swung or is impacted by an outer force, the impact force is absorbed by the elastic assembly 24. As a result, the lens assembly 3 is protected from being damaged by the anti-tilt electromagnetic motor 5. Moreover, in some embodiments, the swinging motion of the anti-tilt electromagnetic motor 5 about the main axis is limited by the elastic elements 241 positioned on the upper and lower sides of the support base 16. Therefore, the degradation of the image quality due to the swaying movement of the lens assembly is prevented.

As shown in FIG. 3, since the support base 16 is slidably moved relative to the frame 14 via the contacting assembly 22, and the contact assembly 22 is not fixed at the first and second guide portions 148 and 168 and is able to move relative to the first and second guide portions 148 and 168 in a rolling manner, the clearance between the frame 14 and the support base 16 along a direction perpendicular to the main axis (X-axis and Y-axis) is adjustable via the contacting assembly. As a result, the production yield of the anti-tilt electromagnetic motor 5 is increased, and the manufacturing cost is decreased.

Because of differences in the configuration of the upper and lower elastic elements and arrangement thereof, the lens device 1 of the disclosure is driven by less electric current than a conventional voice coil actuator (VCA). Therefore, the advantage of lower power consumption is achieved. In addition, the friction force generated between the contacting assembly and the plastic member (such as the support base 16) is adapted to balance the weight of the support base 16 (moving part), so that the electrical current for stopping the support base 16 as it reaches a predetermined position is decreased. Moreover, the control accuracy of the support base 16 is improved with the application of the sensor element 28 of the lens device 1.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An anti-tilt electromagnetic motor for moving a lens assembly, comprising:
    a frame, defining a center and a first axis extending through the center;
    a support base, supporting the lens assembly and arranged movably relative to the frame along a main axis of the anti-tilt electromagnetic motor which is perpendicular to the first axis;
    a contact assembly, including a plurality of ball bearings movably disposed in a gap between the frame and the support base, wherein the ball bearings are situated on opposite sides of the first axis and in contact with the frame and the support base;

a drive assembly, configured to actuate a movement of the support base relative to the frame; and an elastic element, extending across the gap and directly connecting the support base with the frame, wherein the elastic element has a plurality of first fixing portions fixed to the frame and a plurality of second fixing portions fixed to the support base, wherein the ball bearings are situated between the first and second fixing portions along a direction parallel to the first axis, and wherein the elastic element is arranged on a plane which is perpendicular to the main axis.

2. The anti-tilt electromagnetic motor as claimed in claim 1, wherein the elastic element has a plurality of first fixing portions fixed to the frame and a plurality of second fixing portions fixed to the support base, wherein the first and second fixing portions are situated on opposite sides of a central axis of the frame which is perpendicular to the first axis and the main axis.

3. The anti-tilt electromagnetic motor as claimed in claim 2, wherein the support base and the drive assembly are arranged along the first axis, and the first fixing portions and the drive assembly are situated on the same side of the central axis of the frame which is perpendicular to the first axis and the main axis.

4. The anti-tilt electromagnetic motor as claimed in claim 1, wherein the elastic element has a plurality of first fixing portions fixed to the frame and symmetrical with respect to the first axis.

5. The anti-tilt electromagnetic motor as claimed in claim 4, wherein the elastic element has a plurality of second fixing portions fixed to the support base and symmetrical with respect to the first axis.

6. The anti-tilt electromagnetic motor as claimed in claim 1, wherein the elastic element is configured to provide a pre-loading force to press the ball bearings between the frame and the support base.

7. The anti-tilt electromagnetic motor as claimed in claim 1, wherein the frame has a rectangular structure, and the ball bearings are disposed near the corners of the rectangular structure.

8. The anti-tilt electromagnetic motor as claimed in claim 1, wherein the ball bearings are disposed along a second axis of the frame which is perpendicular to the first axis.

9. The anti-tilt electromagnetic motor as claimed in claim 1, wherein the ball bearings are disposed along a second axis of the frame which is perpendicular to the first axis, and the second axis extends through the lens assembly.

10. An anti-tilt electromagnetic motor for moving a lens assembly, comprising:

a frame, defining a center and a first axis extending through the center; a support base, supporting the lens assembly and arranged movably relative to the frame along a main axis of the anti-tilt electromagnetic motor which is perpendicular to the first axis;

a contact assembly, including a plurality of ball bearings movably disposed in a gap between the frame and the support base;

an elastic element, having a plurality of first fixing portions fixed to the frame and a plurality of second fixing portions fixed to the support base, extending across the gap and directly connecting the support base with the frame, wherein the ball bearings are situated between the first and second fixing portions along a direction parallel to the first axis, wherein the elastic element is arranged on a plane which is perpendicular to the main axis; and a drive assembly, configured to actuate a movement of the support base relative to the frame, wherein the support base and the drive assembly are arranged along the first axis, and the first fixing portions and the drive assembly are situated on the same side of a central axis of the frame which is perpendicular to the first axis and the main axis.

11. The anti-tilt electromagnetic motor as claimed in claim 10, wherein the first and second fixing portions are situated on opposite sides of a central axis of the frame which is perpendicular to the first axis and the main axis.

12. The anti-tilt electromagnetic motor as claimed in claim 11, wherein the elastic element forms a U-shaped structure with the first fixing portions respectively disposed at both ends thereof.

13. The anti-tilt electromagnetic motor as claimed in claim 10, wherein the elastic element has a plurality of first fixing portions fixed to the frame and symmetrical with respect to the first axis.

14. The anti-tilt electromagnetic motor as claimed in claim 10, wherein the elastic element has a plurality of second fixing portions fixed to the support base and symmetrical with respect to the first axis.

15. The anti-tilt electromagnetic motor as claimed in claim 10, wherein the elastic element is configured to provide a pre-loading force to press the ball bearings between the frame and the support base.

16. The anti-tilt electromagnetic motor as claimed in claim 10, wherein the frame has a rectangular structure, and the ball bearings are disposed near the corners of the rectangular structure.

17. The anti-tilt electromagnetic motor as claimed in claim 10, wherein the ball bearings are disposed along a second axis of the frame which is perpendicular to the first axis.

18. The anti-tilt electromagnetic motor as claimed in claim 10, wherein the ball bearings are disposed along a second axis of the frame which is perpendicular to the first axis, and the second axis extends through the lens assembly.

* * * * *